(12) United States Patent
Locke et al.

(10) Patent No.: US 10,650,593 B2
(45) Date of Patent: May 12, 2020

(54) HOLOGRAPHIC TECHNOLOGY IMPLEMENTED SECURITY SOLUTION

(71) Applicant: TYCO FIRE & SECURITY GMBH, Neuhausen am Rheinfall (CH)

(72) Inventors: Robert B. Locke, Sonoma, CA (US); Paul B. Rasband, Fremont, CA (US); Rain Cui, San Mateo, CA (US); Steve Schattmaier, Dana Point, CA (US); Richard Campero, Gilroy, CA (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 165 days.

(21) Appl. No.: 15/379,647

(22) Filed: Dec. 15, 2016

(65) Prior Publication Data

US 2018/0018867 A1   Jan. 18, 2018

Related U.S. Application Data

(60) Provisional application No. 62/361,669, filed on Jul. 13, 2016, provisional application No. 62/361,053, filed on Jul. 12, 2016.

(51) Int. Cl.
*G08B 29/18* (2006.01)
*H04N 7/18* (2006.01)
(Continued)

(52) U.S. Cl.
CPC .......... *G06T 19/006* (2013.01); *G02B 27/017* (2013.01); *G06F 3/005* (2013.01); *G06F 3/017* (2013.01); *G06F 3/1446* (2013.01); *G06F 3/16* (2013.01); *G06F 3/167* (2013.01); *G06F 17/218* (2013.01); *G06F 17/241* (2013.01); *G06F 17/2705* (2013.01); *G06K 9/00288* (2013.01); *G06K 9/00362* (2013.01);
(Continued)

(58) Field of Classification Search
CPC .............. G06K 9/00771; G06T 19/006; G08B 13/19656; G10L 15/30
See application file for complete search history.

(56) References Cited

U.S. PATENT DOCUMENTS 5,357,148 A   10/1994   Rotay
7,249,064 B1   7/2007   Carmen
(Continued)

OTHER PUBLICATIONS

Sala et al., Personal Identification Through 3D Biometric Measurements Based on Stereoscopic Image Pairs, 2006.
(Continued)

*Primary Examiner* — Mainul Hasan
(74) *Attorney, Agent, or Firm* — Foley & Lardner LLP

(57) ABSTRACT

A server system can receive an assertion of an alarm condition from a security system that processes sensor signals from sensors and that triggers the alarm condition. The server system is can send messages to determined nearby sensors to start sending data back to the server system according to the alarm condition. The server system can analyze sensor data received from the sensors. The analysis includes a verification of the alarm condition, a determination of how often queried data is requested, and a determination of which of selected data received from selected sensors to forward to one or more mixed reality devices. The server system can forward data to the one or more mixed reality.

18 Claims, 4 Drawing Sheets

(51) Int. Cl.

| | | |
|---|---|---|
| *G06T 19/00* | (2011.01) | |
| *G08B 13/196* | (2006.01) | |
| *G02B 27/01* | (2006.01) | |
| *H04N 13/02* | (2006.01) | |
| *G08B 29/24* | (2006.01) | |
| *G06N 3/00* | (2006.01) | |
| *G06K 9/00* | (2006.01) | |
| *H04N 13/204* | (2018.01) | |
| *H04N 13/344* | (2018.01) | |
| *H04N 13/398* | (2018.01) | |
| *G06F 3/00* | (2006.01) | |
| *G06F 3/01* | (2006.01) | |
| *G06F 3/14* | (2006.01) | |
| *G06Q 30/02* | (2012.01) | |
| *H04N 13/332* | (2018.01) | |
| *G07C 9/00* | (2020.01) | |
| *G06F 3/16* | (2006.01) | |
| *G06N 5/04* | (2006.01) | |
| *G06Q 50/00* | (2012.01) | |
| *G06F 17/21* | (2006.01) | |
| *G06F 17/24* | (2006.01) | |
| *G06F 17/27* | (2006.01) | |
| *G10L 15/22* | (2006.01) | |
| *G10L 15/26* | (2006.01) | |
| *G06T 19/20* | (2011.01) | |
| *G10L 15/30* | (2013.01) | |

(52) U.S. Cl.
CPC ..... *G06K 9/00671* (2013.01); *G06K 9/00771* (2013.01); *G06N 3/006* (2013.01); *G06N 5/043* (2013.01); *G06Q 30/0201* (2013.01); *G06Q 30/0269* (2013.01); *G06Q 50/01* (2013.01); *G07C 9/00087* (2013.01); *G10L 15/22* (2013.01); *G10L 15/26* (2013.01); *H04N 7/183* (2013.01); *H04N 13/204* (2018.05); *H04N 13/332* (2018.05); *H04N 13/344* (2018.05); *H04N 13/398* (2018.05); *G02B 2027/014* (2013.01); *G02B 2027/0134* (2013.01); *G02B 2027/0141* (2013.01); *G06T 19/20* (2013.01); *G06T 2219/004* (2013.01); *G08B 13/19608* (2013.01); *G08B 13/19656* (2013.01); *G10L 15/30* (2013.01); *G10L 2015/223* (2013.01)

(56) References Cited

U.S. PATENT DOCUMENTS

| | | | |
|---|---|---|---|
| 8,009,100 B2 | 8/2011 | Falk | |
| 8,223,088 B1 | 7/2012 | Gomez et al. | |
| 8,965,460 B1 | 2/2015 | Rao et al. | |
| 9,672,707 B2 | 6/2017 | Kerzner | |
| 9,721,373 B2 | 8/2017 | Marsella | |
| 9,811,990 B2 | 11/2017 | Kerzner | |
| 9,823,744 B2 | 11/2017 | Publicover et al. | |
| 10,049,544 B2 | 8/2018 | Kerzner | |
| 2002/0003571 A1 | 1/2002 | Schofield et al. | |
| 2002/0073333 A1* | 6/2002 | Palka | H04L 41/06 726/11 |
| 2002/0147982 A1* | 10/2002 | Naidoo | G08B 13/19645 725/105 |
| 2003/0025599 A1 | 2/2003 | Monroe | |
| 2003/0158771 A1 | 8/2003 | Shen et al. | |
| 2004/0075738 A1 | 4/2004 | Burke et al. | |
| 2004/0105570 A1 | 6/2004 | Venetianer et al. | |
| 2004/0125207 A1 | 7/2004 | Mittal et al. | |
| 2005/0010649 A1 | 1/2005 | Payne et al. | |
| 2005/0137890 A1 | 6/2005 | Bhatt et al. | |
| 2005/0184867 A1 | 8/2005 | Osann | |
| 2005/0207487 A1 | 9/2005 | Monroe | |
| 2006/0136575 A1 | 6/2006 | Payne et al. | |
| 2006/0179463 A1 | 8/2006 | Chisholm et al. | |
| 2007/0072662 A1 | 3/2007 | Templeman | |
| 2008/0071559 A1 | 3/2008 | Arrasvuori | |
| 2008/0189169 A1 | 8/2008 | Turpin et al. | |
| 2008/0246136 A1 | 10/2008 | Haba et al. | |
| 2009/0022362 A1* | 1/2009 | Gagvani | G08B 13/19615 382/100 |
| 2009/0102859 A1 | 4/2009 | Athsani et al. | |
| 2009/0267836 A1 | 10/2009 | Falk | |
| 2010/0225006 A1 | 9/2010 | Haba et al. | |
| 2011/0058036 A1 | 3/2011 | Metzger et al. | |
| 2011/0090334 A1* | 4/2011 | Hicks, III | G08B 19/005 348/143 |
| 2011/0167010 A1 | 7/2011 | Soppera et al. | |
| 2011/0169637 A1* | 7/2011 | Siegler, II | G08B 25/002 340/541 |
| 2011/0213664 A1 | 9/2011 | Osterhout et al. | |
| 2011/0225069 A1 | 9/2011 | Cramer et al. | |
| 2011/0254680 A1* | 10/2011 | Perkinson | G08B 25/14 340/506 |
| 2012/0188072 A1* | 7/2012 | Dawes | G06Q 50/12 340/514 |
| 2012/0195464 A1 | 8/2012 | Ahn | |
| 2012/0242698 A1 | 9/2012 | Haddick et al. | |
| 2012/0290521 A1 | 11/2012 | Frank et al. | |
| 2013/0050262 A1 | 2/2013 | Jeon | |
| 2013/0065390 A1 | 3/2013 | Haba et al. | |
| 2013/0120135 A1* | 5/2013 | Benson | G05B 13/0275 340/506 |
| 2013/0241760 A1 | 9/2013 | Chen et al. | |
| 2014/0002236 A1 | 1/2014 | Pineau et al. | |
| 2014/0081858 A1 | 3/2014 | Block et al. | |
| 2014/0160250 A1 | 6/2014 | Pomerantz et al. | |
| 2014/0180972 A1 | 6/2014 | Boldyrev et al. | |
| 2014/0236903 A1 | 8/2014 | Dirienzo | |
| 2014/0344420 A1 | 11/2014 | Rjeili et al. | |
| 2014/0361956 A1* | 12/2014 | Mikhailov | H04N 13/271 345/8 |
| 2015/0020086 A1 | 1/2015 | Chen et al. | |
| 2015/0112826 A1 | 4/2015 | Crutchfield, Jr. | |
| 2015/0254972 A1* | 9/2015 | Patterson | G08B 29/185 340/545.1 |
| 2015/0317418 A1 | 11/2015 | Sankarapandian et al. | |
| 2015/0317501 A1 | 11/2015 | Safai et al. | |
| 2016/0020948 A1 | 1/2016 | Janz et al. | |
| 2016/0062459 A1 | 3/2016 | Publicover et al. | |
| 2016/0070343 A1 | 3/2016 | Li | |
| 2016/0085302 A1 | 3/2016 | Publicover et al. | |
| 2016/0124071 A1 | 5/2016 | Baxley et al. | |
| 2016/0209648 A1 | 7/2016 | Haddick et al. | |
| 2016/0232777 A1* | 8/2016 | Jedwab | G08B 31/00 |
| 2016/0267759 A1* | 9/2016 | Kerzner | G08B 13/19684 |
| 2016/0269491 A1 | 9/2016 | Eom et al. | |
| 2016/0274660 A1 | 9/2016 | Publicover et al. | |
| 2016/0316189 A1 | 10/2016 | Lee et al. | |
| 2017/0039829 A1 | 2/2017 | Kerzner | |
| 2017/0090556 A1 | 3/2017 | Baba et al. | |
| 2017/0263091 A1 | 9/2017 | Kerzner | |
| 2017/0368439 A1 | 12/2017 | Khazanov et al. | |
| 2018/0018681 A1 | 1/2018 | Locke et al. | |
| 2018/0018708 A1 | 1/2018 | Locke et al. | |
| 2018/0018823 A1 | 1/2018 | Cianciolo et al. | |
| 2018/0018824 A1 | 1/2018 | Locke et al. | |
| 2018/0018862 A1 | 1/2018 | Kerzner | |
| 2018/0018867 A1 | 1/2018 | Locke et al. | |
| 2018/0268219 A1 | 9/2018 | Miller et al. | |
| 2018/0286134 A1 | 10/2018 | Warhol | |
| 2018/0303667 A1 | 10/2018 | Peyman | |
| 2018/0350217 A1 | 12/2018 | Kerzner | |

OTHER PUBLICATIONS

Notice of Allowance for U.S. Appl. No. 15/381,588, dated Jul. 5, 2018, 8 pages.
Office Action for U.S. Appl. No. 15/379,657, dated Jun. 28, 2018, 10 pages.

(56) References Cited

OTHER PUBLICATIONS

Office Action for U.S. Appl. No. 15/381,396, dated Jun. 28, 2018, 23 pages.
Office Action for U.S. Appl. No. 15/381,588, dated Dec. 12, 2017, 9 pages.
"*Microsoft HoloLens*," Wikipedia, (May 3, 2018), [Retrieved from the Internet]: https://en.wikipedia.org/wiki/Microsoft_HoloLens.

\* cited by examiner

HOLOGRAPHIC TECHNOLOGY IMPLEMENTED SECURITY SOLUTION

CLAIM OF PRIORITY

This application claims priority under 35 U.S.C. § 119(e) to provisional U.S. Patent Application 62/361,053, filed on Jul. 12, 2016, entitled: "Holographic Technology Implemented Security and Retail Solutions" the entire contents of which is incorporated herein by reference and provisional U.S. Patent Application 62/361,669, filed on Jul. 13, 2016, entitled: "Holographic Technology Implemented Security and Retail Solutions the entire contents of which is incorporated herein by reference.

BACKGROUND

This description relates to intrusion, surveillance and alarm systems of various types (generally security systems) and integrated versions of such security systems that combine two or more of such systems.

It is common for businesses and homeowners to have a security system for detecting alarm conditions at their facility and signaling the conditions to a monitoring station or authorized users of the security system. For example, such buildings employ systems in the areas of fire detection, smoke detection, intrusion detection, access control, video surveillance etc. Many different types of security sensors are deployed in such commercial and residential buildings. Sensors (detectors) can be of various types such as motion detectors, cameras, proximity sensors, etc.

Augmented reality, virtual reality and mixed reality technologies are known. Generally, virtual reality refers to technologies that replicate an environment with a simulation of a user being immersed in the replicated environment. Augmented reality, generally refers to technologies that present a view of a real-world environment augmented with computer generated data. Mixed reality a relatively new term generally involves technologies that involve a merging of real world and virtual world environments where real and virtual objects exist and interact.

SUMMARY

According to an aspect, a system includes one or more server systems configured to receive an assertion of an alarm condition from a security system that processes sensor signals from sensors and that triggers the alarm condition, send messages to determined nearby sensors to start sending data back to the servers according to the alarm condition, analyze sensor data received from the sensors, the analysis including a verification of the alarm condition, a determination of additional sensors to query for additional data, and a determination of which of selected data received from selected sensors to forward to one or more mixed reality devices, and forward data to one or more mixed reality devices, with the data forwarded being determined in part based on the analysis performed by the one or more server systems.

Aspects also include computer program products and computer implemented methods.

One or more of the following advantages may be provided by one or more of the above aspects.

The servers in conjunction with mixed reality and/or augmented reality and virtual reality technologies may improve analysis of security situations. The disclosed techniques use computer implemented techniques that obtain information from various electronic systems/devices in the physical world, which devices are exemplified by security systems, and merge that information into a virtual world of policies and analytics that involve such security systems. These techniques can provide addition and continually information to responders for situations that pose hazards or risks such as in responding to emergency conditions, either a fire or a physical intrusion or an accident, for instance.

The details of one or more embodiments of the invention are set forth in the accompanying drawings and the description below. Other features, objects, and advantages of the invention is apparent from the description and drawings, and from the claims.

DETAILED DESCRIPTION

Figure 1:
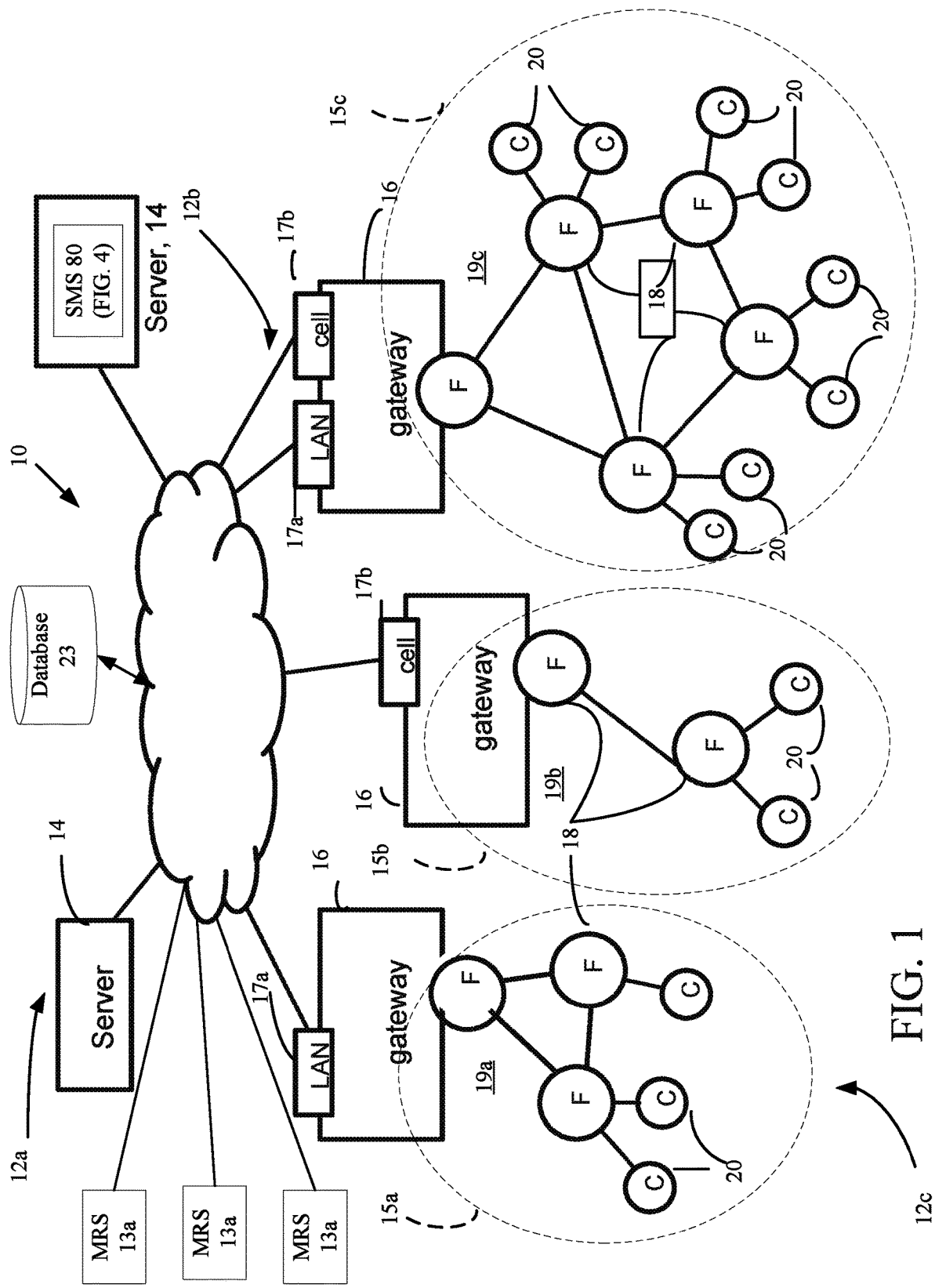
FIG. 1 is a schematic diagram of an exemplary networked security system integrated with mixed reality device processing.

As shown in FIG. 1, described herein are examples of an integrated platform 10 that integrates via a distributed network 11, mixed reality devices 13a-13c with security/intrusion/alarm/surveillance systems 15a-15c (typically including sensors 20, functional nodes 18 and typically including a panel not shown).

Examples of mixed reality devices 13a-13c are those in which the mixed reality devices incorporate a live, real world presentation of elements of the physical real-world with virtual elements that are calculated or produced from inputs and which are rendered on a display so that to a user these calculated or produced elements are perceived to exist together with the physical real world in a common environment. Examples of such mixed reality devices 13a-13c include mixed reality devices such as Hololens® (Microsoft), (a smart-glasses, cordless, Windows 10® (Microsoft) computer headset that includes various sensors and a high-definition stereoscopic 3D optical head-mounted display, and spatial sound to allow for augmented reality applications. Other mixed reality devices/augmented reality systems such as Google Glass® (Google) could be used. There are many such systems on the market of which these are two examples.

The security systems 15a-15c typically include a panel (not shown), such as for an intrusion detection system, an intrusion detection panel wired or wirelessly connected to a variety of sensors deployed in a facility. Typically, such panels receive signals from one or more of these sensors to indicate a current state or value or that a particular condition being monitored has changed or become unsecure.

The integrated platform 10 includes data collection systems that are coupled to wireless sensor networks and wireless devices, with remote server-based monitoring via servers 14 and report generation. As described in more detail below, wireless sensor networks generally use a combination of wired and wireless links between computing devices, with wireless links usually used for the lowest level connections (e.g., end-node device to hub/gateway 16). In an example network, the edge (wirelessly-connected) tier of the network is comprised of resource-constrained devices 20 with specific functions. These devices 20 may have a small-to-moderate amount of processing power and memory, and may be battery powered, thus requiring that they conserve energy by spending much of their time in sleep mode. A typical model is one where the edge devices 20 generally form a single wireless network in which each end-node communicates directly with its parent node (e.g., 18) in a hub-and-spoke-style architecture. The parent node may be, e.g., an access point on a gateway or a sub-coordinator which is, in turn, connected to the access point or another sub-coordinator.

In FIG. 1, the distributed network 11 is logically divided into a set of tiers or hierarchical levels 12a-12c. The mixed reality devices 13a-13n are shown in communication with the top one or two tiers or hierarchical levels 12a-12c. In FIG. 1, the lower level tier 12c is illustrated divided into different facility 19a-19c for ease in explaining details of the applications that will be discussed below. The facility 19a-19c are each associated with one of the security systems 15a-15c. The security systems can be independent meaning that there are no connections (as shown) among fully functional nodes of different facility or dependent meaning that there are connections (not shown) among fully functional nodes of different facility.

Figure 4:
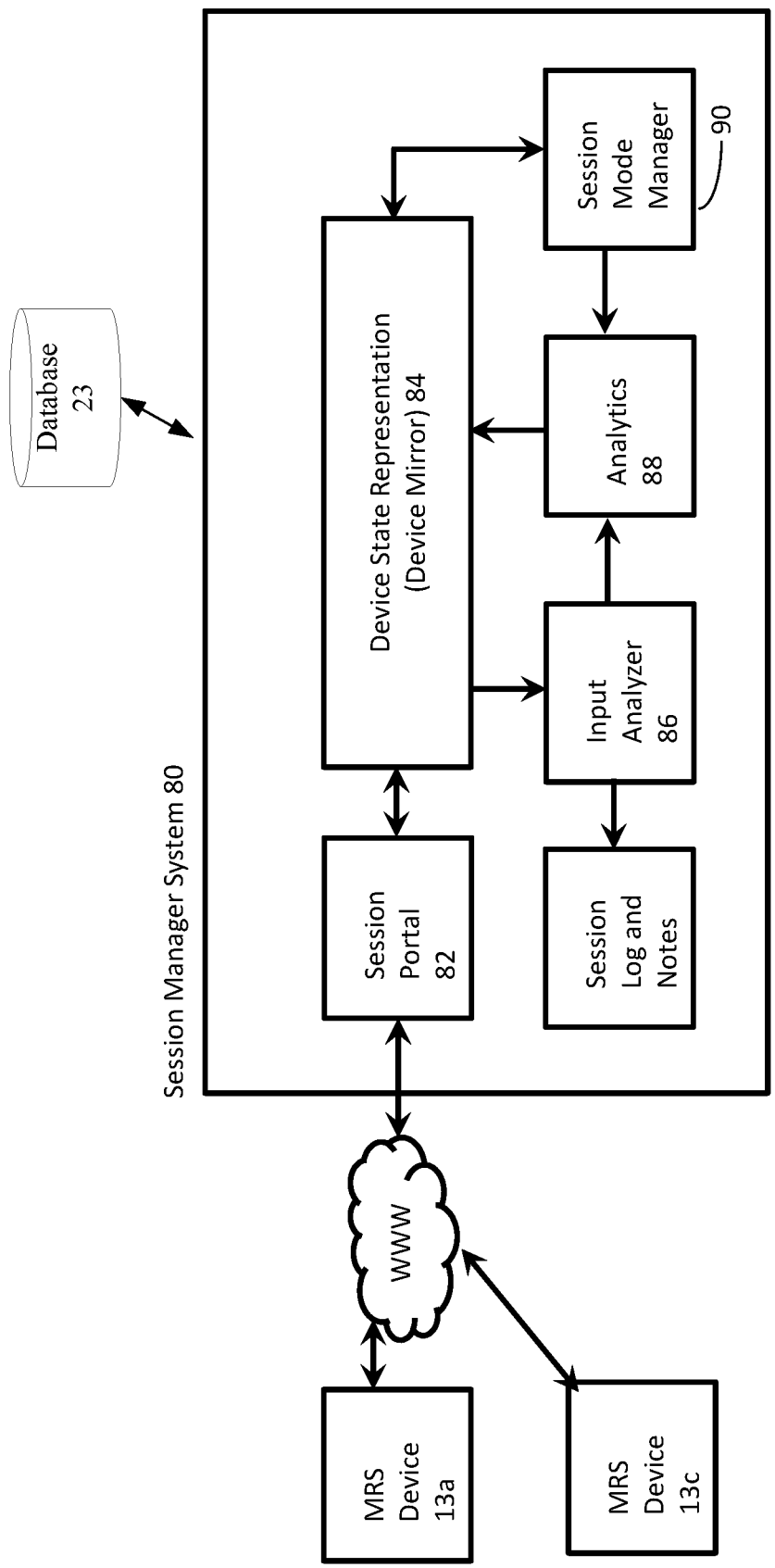
FIG. 4 is a block diagram of a mixed reality device session manager.

In the upper tier or hierarchical level 12a of the network are disposed servers and/or virtual servers 14 running a "cloud computing" paradigm that are networked together using well-established networking technology such as Internet protocols or which can be private networks that use none or part of the Internet. Applications that run on those servers 14 communicate using various protocols such as for Web Internet networks XML/SOAP, RESTful web service, and other application layer technologies such as HTTP and ATOM. The distributed network 11 has direct links between devices (nodes) as shown and discussed below. Servers 14 execute analytics (analysis programs of various sorts) that are managed in concert with a session manager system 80 (FIG. 4). The servers 14 can access a database 23.

The second logically divided tier or hierarchical level 12b, referred to here as a middle tier, involves gateways 16 located at central, convenient places inside individual buildings and structures, e.g., 13a-13c. These gateways 16 communicate with servers 14 in the upper tier whether the servers are stand-alone dedicated servers and/or cloud based servers running cloud applications using web programming techniques. The middle tier gateways 16 are also shown with both local area network 17a (e.g., Ethernet or 802.11) and cellular network interfaces 17b. Each gateway is equipped with an access point (fully functional node or "F" node) that is physically attached to that access point and that provides a wireless connection point to other nodes in the wireless network. The links (illustrated by lines not numbered) shown in FIG. 1 represent direct (single-hop MAC layer) connections between devices. A formal networking layer (that functions in each of the three tiers shown in FIG. 1) uses a series of these direct links together with routing devices to send messages (fragmented or non-fragmented) from one device to another over the network.

The distributed network topology also includes a lower tier (edge layer) 12c set of devices that involve fully-functional sensor nodes 18 (e.g., sensor nodes that include wireless devices, e.g., transceivers or at least transmitters, which in FIG. 1 are marked in with an "F") as well as constrained wireless sensor nodes or sensor end-nodes 20 (marked in the FIG. 1 with "C"). In some embodiments wired sensors (not shown) can be included in aspects of the distributed network 11.

The distributed network 11 implements a state machine approach to an application layer that runs on the lower tier devices 18 and 20. States in the state machine are comprised of sets of functions that execute in coordination, and these functions can be individually deleted or substituted or added to in order to alter the states in the state machine of a particular lower tier device. The state function based application layer uses an edge device operating system that allows for loading and execution of individual functions (after the booting of the device) without rebooting the device (so-called "dynamic programming"). In other implementations, edge devices could use other operating systems provided such systems allow for loading and execution of individual functions (after the booting of the device) preferably without rebooting of the edge devices.

Figure 2:
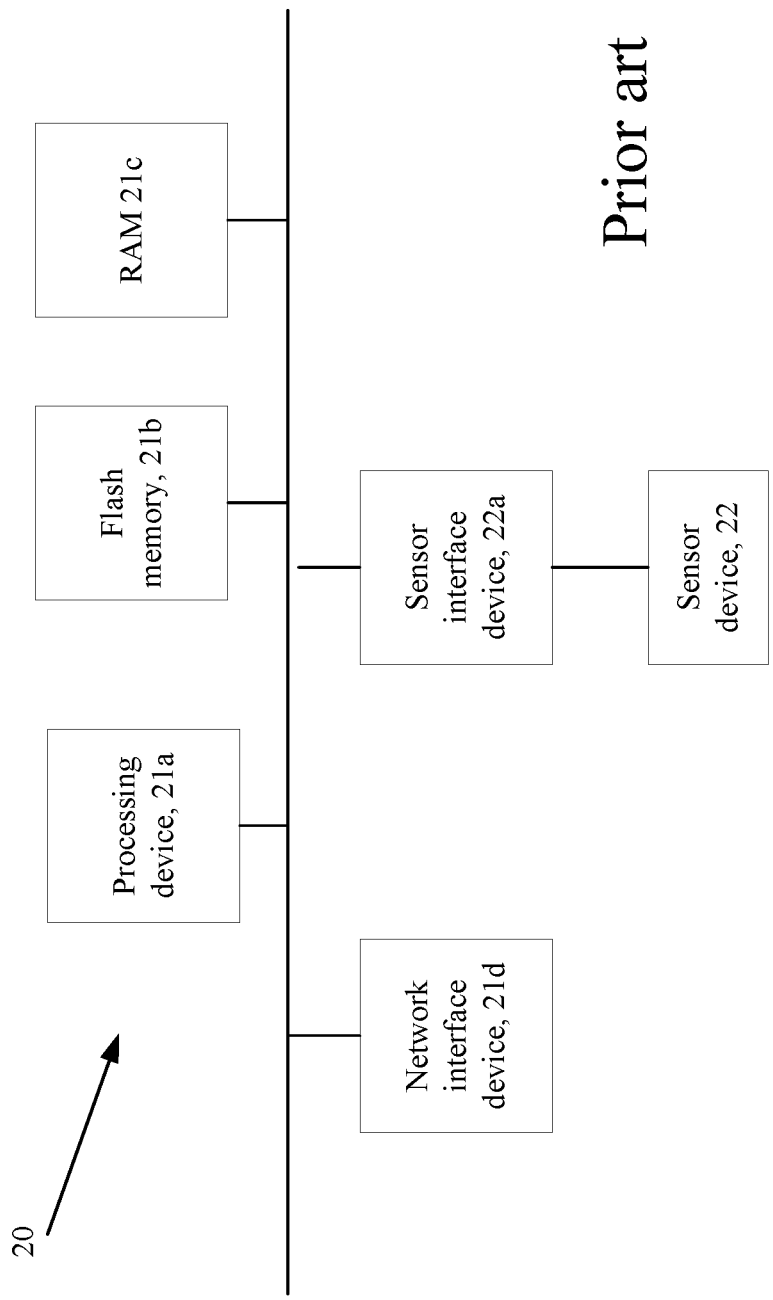
FIG. 2 is a block diagram of a generally conventional constrained device used in a security application.

Referring to FIG. 2, a generic constrained computing device 20 that is part of the security/intrusion/alarm/surveillance systems (either integrated examples of such system or standalone examples) is shown. A constrained device 20 as used herein is a device having substantially less persistent and volatile memory other computing devices, sensors, systems in a particular networked detection/sensor/alarm system. Constrained device 20 includes a processor device 21a, e.g., a CPU and or other type of controller device that executes under an operating system, generally with 8-bit or 16-bit logic rather than the 32- and 64-bit logic used by high-end computers and microprocessors. The constrained device 20 has a relatively small flash/persistent store 21b and volatile memory 21c in comparison with other the computing devices on the network. Generally the persistent store 21b is about a megabyte of storage or less and volatile memory 21c is about several kilobytes of RAM memory or less.

The constrained device 20 has a network interface card 21d that interfaces the constrained device 20 to the network 11. Typically a wireless interface card is used, but in some instances a wired interface could be used. Alternatively, a transceiver chip driven by a wireless network protocol stack (e.g., 802.15.4/6LoWPAN) can be used as the (wireless) network interface. These components are coupled together via a bus structure. The constrained device 20 also includes a sensor 22 and a sensor interface 22a that interfaces to the processor 21a. Sensor 22 can be any type of sensor type device. Typical types of sensors include temperature, simple motion, 1- 2- or 3-axis acceleration force, humidity, pressure, selective chemical, sound/piezo-electric transduction, and/or numerous others, implemented singly or in combination to detect complex events.

The disclosed implementations of a constrained device 20 can follow the current constraints on flash/persistent storage memory and RAM memory and less than 10-20 kilobytes of RAM/volatile memory, but can have more depending on configuration and in some instances the operating system. These constrained devices 20 are configured in this manner; generally due to cost/physical configuration considerations. These types of constrained devices 20 generally have a static software image (i.e., the logic programmed into the constrained device is always the same).

Constrained devices 20 execute a real-time operating system that can use dynamic programming and support. The real-time operating system ("RTOS") executes and otherwise manages a dynamic set of user-defined independent executable functions or tasks that are either built into a loaded image (software and RTOS that executes on the constrained device) or that are downloaded during normal operation of the constrained device 20 or a combination of the two, with the former (built into the image) using as subroutines instances of the latter (downloaded during operation). Certain of the applications set forth below will cause systems to access these constrained devices 20 to upload data and otherwise control the devices 20 according to needs of the applications.

In the examples below, a facility can be any type but is typically, e.g., a commercial, industrial, facility, with interior areas, (buildings) and exterior areas that are subject to surveillance and other types of monitoring. The buildings can be of any configuration, wide open spaces such as a warehouse, to compartmentalized facilities such as labs/offices.

Figure 3:
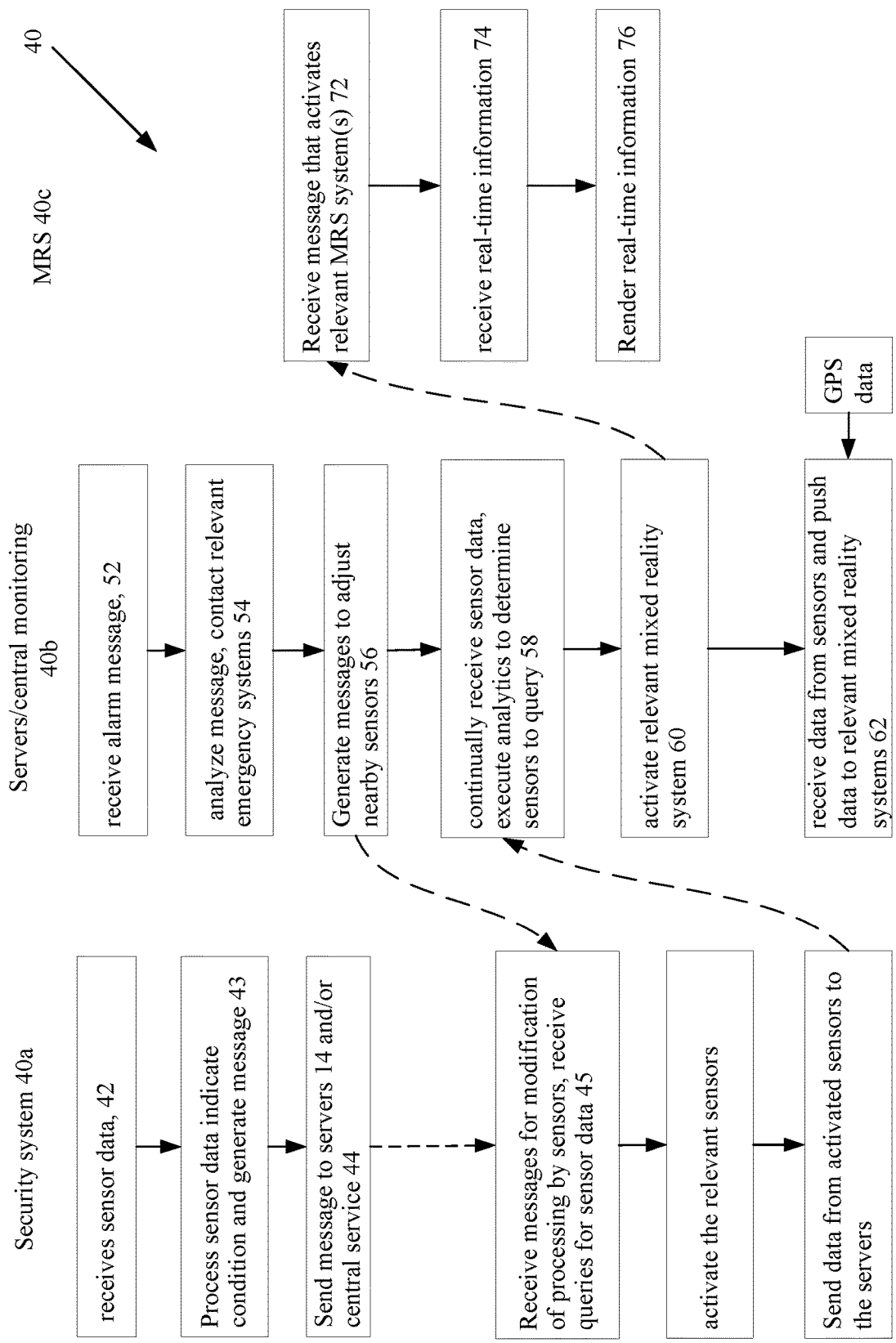
FIGS. 3A-3C are flow charts depicting application processing using mixed reality technologies with security systems.

Referring now to FIGS. 3A-3C, "merged sensor" processing 40 is shown. Merged sensor processing combines processing performed in the integrated platform 10 with processing performed by one or more of the mixed reality devices 13a-13c. In this example, the merged sensor processing 40 is configured for security systems.

As shown in FIG. 3A, a first aspect 40a of merged sensor processing 40 (local security system processing) has security system 15a, e.g., one or more of systems 15a-15c (FIG. 1) receiving sensor data 42 from one or more sensors. These data are processed and when the processing indicates a condition, the security system generates 43 a message that an alarm has triggered at a facility (e.g., 19a-19c). Any such condition triggered could be the basis of the message. The message will include data that delineates the type of condition that was triggered, data that indicates data values of measured by one or more sensors, and the address of the panel and/or sensor(s) that were involved in triggering the condition. Other information would be provided. The message is sent 44 to the central monitor system and/or the servers 14.

As shown in FIG. 3B, a second aspect 40a of merged sensor processing 40 (server/central monitoring processing) occurs at either the central monitor system and/or the servers 14 that receive 52 from the security system 15a the message that an alarm condition has been triggered at the facility 19a. The central monitor system and/or the servers 14 process 54 the message to extract the data that delineates the type of condition that was triggered, the data values measured by one or more of the sensors, and the address of the panel and/or sensor(s) that were involved in triggering the condition. The central monitor system and/or the servers 14 (if needed inform the other of the central monitor system and/or the servers 14) and process this data using various analytics. For instances where the central monitoring service and the server computers are different systems, one of these systems will inform the other of the systems. In other implementations these can be the same systems.

For instance, as an example, the message include an indication of a fire alarm condition being triggered at facility 19a. This condition is sent to the central monitor system and/or the servers 14 that typically monitors the facility 19a in which the alarm was triggered. The central monitor system and/or the servers 14 calls a dispatcher to dispatch emergency services, e.g., fire and ambulance services, to the affected facility 19a.

The central monitor system and/or the servers 14, based on the nature of the condition and network addresses of sensors, identify and determine 56 any relevant nearby sensors and generate messages that are sent to the security system to adjust operation of those determined nearby sensors. That is, whether controlled by the central monitoring system or server computers 14 in the cloud or by local systems (not shown), the triggering of the alarm condition is used to adjust other nearby sensors (within system 15a, if system 15a is independent from other systems) to either turn on and start sending data to the upper tier 12a via the middle tier or modify operation by having the upper tier change processes running on the lower tier, as discussed above. In situations where system 15a is dependent on other systems, e.g., 15b and 15c, these systems as well can be sent messages to have sensors send/modify operation. In situations where system 15a is independent of other systems, e.g., 15b and 15c, but system 15a is in close physical proximity to these other systems, these other system as well can be sent messages to have sensors in those systems send/modify operation.

The assertion of a fire alarm causes sensor data from sensors 20 to be sent to the cloud based servers 14. From this assertion, the cloud based servers 14 process 58 the sensor data either from all sensors in the facility or nearby sensors. Analytics running on these servers 14 will be used to determine what sensors are queried for sensor data and how often the queried data is requested. Thus, by a device 20 on the network experiencing an event (the alarm condition) that event can be clarified through the analytic applications executing in the cloud servers, i.e., whether the event is confirmed or not, by the cloud servers initiating queries that are sent to other sensors for data to clarify the event. That is, the cloud servers 14 access a database 23 for IP addresses of nearby sensors (in the facility and from nearby facility or locations, if available) and form queries that are sent to those sensors through the network 11. The queries are messages for relevant data collected from the relevant sensors, and then depending on the determined nature of the event, either the alarm is sent or a false alarm is noted.

In the case where an alarm is sent, the servers 14 in addition to a normal contact of the relevant emergency management service systems, e.g., fire department, as discussed above, the servers 14 also send 60 to relevant ones of the mixed reality devices 13a-13c messages that include live video and which in some instances can also be used to awaken the mixed reality devices 13a-13c. The servers 14, based on the determined conditions, select which of the plurality of mixed reality devices 13a-13c to send 62 video feeds. The selection is based on the location of the facility and the relevant emergency management service(s) required for that facility (and in some implementations based on GPS data and user status, see below).

Alternatively, the determination of the relevant mixed reality devices 13a-13c to activate and to send data to can be determined locally and the mixed reality devices 13a-13c are activated locally/manually. In either instance the relevant mixed reality devices 13a-13c would initiate a connection to the servers 14 with a request for the relevant video as discussed in FIG. 4.

Referring now to FIG. 3C, a third aspect 40c (MRS processing) of merged sensor processing 40 is shown. The relevant mixed reality devices 13a-13c in this implementation are eyeglasses that have integrated 3D optical head-mounted (OHM) display and cameras. With relevant mixed reality devices 13a-13c, the servers 14 send to these reality devices 13a-13c messages that when received 72 activate relevant ones of the mixed reality devices 13a-13c. The servers 14 send real-time information to these activated mixed reality devices 13a-13c. Thus in one implementation, the real-time information is a video feed that is rendered on the (OHM) display of the mixed reality devices 13a-13c, such that the user, e.g., firefighter can observe current conditions at the facility at which the alarm was triggered from video cameras installed at the facility 19a, but with the OHM display being controlled from the servers 14 based on analytical algorithms executed on the servers 14.

This example allows the firefighter to look inside the facility (building) and observe current conditions by the video being rendered on the (OHM) display. The video feed can also be used to display relevant information on the (OHM) display after the alarm has triggered. For example, when a fire detection triggers to alert users to a fire in a building, the video surveillance data for the relevant area is automatically displayed on one or more mixed reality devices. In addition, the first responders (firefighters and medics) and other as security professionals can view the location to determine the type of fire that they will be dealing with as well as the extent and type of injuries that are present.

Another example covers the situation where an intrusion system detects an intruder in a facility. The video surveillance data is automatically displayed on a mixed reality device(s) 13a-13c worn by a police dispatcher and/or the police that respond to the alarm. Other data that would be render besides video include textual data that can be in the form of messages or values of measurements from processing performed by cloud servers, the mixed reality device, etc. The servers 14 determine the relevant mixed reality devices 13a-13c based on physical address of the facility or location of the event, look up IP address(es) of relevant mixed reality devices 13a-13c, and send video feeds augmented with data produced by the analytics to the mixed reality devices 13a-13c at the IP address(es). The mixed reality devices 13a-13c that respond can send queries to the servers 14 in the cloud to download data related to the event.

In some implementations, applications running on the mixed reality devices 13a-13c can process some that the data whereas in others the data and results are processed in cloud based severs 14. The mixed reality devices 13a-13c can include GPS (global position system) transceivers that send GPS data to the cloud servers 14 and that can be used to base what data to send to a given mixed reality devices 13a-13c.

The server computers 14 during analysis will determine the present location of the of the mixed reality devices 13a-13c by receiving GPS location data that specifies the locations of those devices. The GPS data are continually updated and sent to the servers 14. Algorithms executing on the servers 14 will determine which data from which sensors (e.g. cameras) are sent to which of the mixed reality devices 13a-13c. Further, in some implementations if some of the mixed reality devices 13a-13c are assigned according to specified functions of users, e.g., responder, vs. supervisory, vs. manager, not only can the algorithms select data based on GPS location of the mixed reality devices 13a-13c, but the algorithms can select data based on pre-assignments of the mixed reality devices 13a-13c to various users. This could be accomplished by accessing relevant profile information in the database 23 (FIG. 1) that specifies IP address of each of the mixed reality devices 13a-13c and also the status or hierarchy of the user(s) assigned to each of the respective mixed reality devices 13a-13c.

Returning to the firefighter example, the firefighter carries a mixed reality device that is a mobile AR/VR (augmented reality/virtual reality) device that communicates with an executing AR/VR session management system on servers 14. The mixed reality device 13a-13c is connected via a wireless (e.g., WiFi) network with wireless access points. These access points can be installed in the device, a vehicle that carries the firefighter or can those access points that are in the facility. The mixed reality device 13a-13c allows the user to see the real environment with data or "artificial images" imposed on the view of the real environment. Microsoft Hololens® and Google Glass® are examples of commercial devices that allow this mixing of "real" and "virtual" realities as referred to herein also as mixed reality devices.

According to the aspect where the location of the user and the associated one of the mixed reality devices 13a-13c is used in the analysis, the servers will present different video feeds according to current conditions of the facility that change as the GPS locations change. Thus, initially as the firefighters approach the facility, the video may be of sensors external to the facility and immediately inside the facility, so as to provide an initial view of what the firefighter may expect. As the firefighter are poised to enter the facility, condition further inside of the facility can be automatically sent to the firefighter. The firefighter's location is continually determined and tracked (as long as GPS or equivalent data are received). As the firefighter moves around the facility with the mixed reality device other views from other cameras are feed to the mixed reality device, e.g., 13a. The continual tracking may be accomplished through a number of techniques including wireless triangulation of the device, various "internal GPS" technologies (BLE (Bluetooth Low Energy, RFID (radio frequency identification, NFC (near field communication, etc.) or dead-reckoning based accelerometer data integration.

In addition, the servers send other information to the mixed reality devices 13a-13c. The servers 14 to the extent possible can use location information of the cameras (and other sensors) to ascertain where in the facility a firefighter is and convey that information to the firefighter, either by pushing that data to be rendered on the mixed reality devices 13a-13c or based on a command sent from the mixed reality devices 13a-13c to the servers 14. In some embodiments the database 23 can also store a map of the facility that shows internal layouts of the facility and that map information can be used to further refine current locations of the mixed reality devices 13a-13c within the facility.

Referring now to FIG. 4, an AR/VR (mixed reality) session manager system 80 (session manager) 80 that executes on the servers 14 is shown. The session manager 80 interacts with the mixed reality devices 13a-13c over the Internet using a "session portal" 82, e.g., a web service (application programming interface (API) or in another embodiment, a dedicated socket with SMTP or other transfer protocol. The session portal 82 is bi-directional meaning that each of the mixed reality devices (MRS) 13a-13c can send data to the session manager 80 and receive data from the session manager 80. The mixed reality devices (MRS) 13a-13c send updates on their states to the session manager 80. The states of the mixed reality devices 13a-13c are represented virtually or "mirrored" in a device state representation 84 inside the session manager 80.

Input from the mixed reality devices (MRS) 13a-13c to the session manager 80 is used in analytic programs executed on the servers. For example, while cameras in the facility can be sending video feeds to the servers that send relevant data to the mixed reality devices (MRS) 13a-13c, cameras on the mixed reality device 13a-13c may send video of an area showing the current state of the facility being monitored by the security system. This video can be analyzed by input analyzer 86 using various techniques to inform analytical manager 88 that inputs to analytic programs (not shown) executing on the servers 14. The analytics manager 88 uses a current mode and inputs presented to it, in order to decide what to present (virtually) to the user on the device viewer and what to request of the analytics executing on the server. Information presented is produced by the analytics manager using data received from the various analytical programs that execute various analytics both conventional as well as to be developed. The session mode manager 90 monitors the mode selected by the user (as mirrored in the device state representation) and informs the analytics manager of the selection. Session logs and notes (not referenced) can also be stored.

In some embodiments, the session may be logged by the input analyzer 86, including any notes or annotations provided by at least some users of the mixed reality devices 13a-13c, e.g., verbal or text sent from the mixed reality devices 13a-13c or otherwise. This locale log/record in the session manager 80 may be backed up in an external database 23 or other databases (not shown) for long-term storage, reporting, and further analysis. This local session and long-term storage may also include a full record or "recording" of part or all of the session, rather than just the user notes. The mixed reality device 13a-13c can be controlled via a switch on the device, a voice command, and/or a hand gesture that can be used to awakens the device (i.e., loads operating system components and prepares for input) when the device senses motion or can be used to request inputs to the device from the servers 14. The device may require input of a user id and password to enable further operation and interaction with the user and servers 14.

The sensor network illustrated in FIG. 1, is an example of a network that collects and analyzes data from various sensor devices. Other configurations of servers and gateways can be used. In addition, the session manager system 80 can be implemented in the servers 14 or in local or detached server systems.

The servers 14 can be any of a variety of computing devices capable of receiving information, such as a server, a distributed computing system 10, a rack-mounted server and so forth. Servers 14 may be a single server or a group of servers that are at a same location or at different locations. Servers 14 can receive information from client device user device via interfaces. Interfaces can be any type of interface capable of receiving information over a network, such as an Ethernet interface, a wireless networking interface, a fiber-optic networking interface, a modem, and so forth. Server also includes a processor and memory and a bus system including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory computer readable hardware storage devices and media and other types of non-transitory storage devices.

Embodiments can be implemented in digital electronic circuitry, or in computer hardware, firmware, software, or in combinations thereof. Computer programs can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. Other embodiments are within the scope of the following claims.

What is claimed is:

1. A system, comprising:
    one or more server systems configured to:
        receive an assertion of an alarm condition from a security system that processes sensor signals from sensors and that triggers the alarm condition;
        send messages to determined nearby sensors to start sending data back to the one or more server systems according to the alarm condition;
        analyze sensor data received from the sensors, the analysis including a verification of the alarm condition, a determination of how often queried data is requested, a determination of which of selected data received from selected sensors to forward to one or more of a plurality of mixed reality devices, a determination of a specified function of one or more users associated with the plurality of mixed reality devices, and continually updated respective locations of the plurality of mixed reality devices; and
        forward data to the one or more of the plurality of mixed reality devices, with the forwarded data being determined in part based on the analysis performed by the one or more server systems.

2. The system of claim 1 wherein the one or more server systems based on a nature of the condition, and network addresses of sensors determine the relevant nearby sensors; and
    generate messages that are sent to the security system to adjust operation of the relevant nearby sensors, based on the analysis of the sensor data.

3. The system of claim 1 wherein the one or more server systems receive video feeds from cameras in the facility having the security system; and the system is further configured to:
    send video feeds to the one or more of the plurality of mixed reality devices.

4. The system of claim 1 wherein the one or more server systems execute analytic processes to determine which sensors sent queries and construct the queries.

5. The system of claim 1 wherein the one or more server systems access a database for IP addresses of nearby sensors and form queries that are sent to those sensors through the network.

6. The system of claim 1, wherein the plurality of mixed reality devices each comprising:

a processor device;
a head mounted display device including a stereoscopic 3D display; and
a storage device that stores a program of computing instructions for execution by the processor, the program comprising instructions configured to cause the processor to:
receive data from the one or more server systems; and
send a request to the one or more server systems for additional data pertaining to the assertion of the alarm condition; and
render the information on the head mounted display device.

7. The system of claim 1 further comprising:
a session manager that controls interactions with the plurality of mixed reality devices over the Internet using a "session portal" that includes a web service API (application programming interface) or a dedicated socket with a transfer protocol.

8. A method, comprising:
receiving by a server system an assertion of an alarm condition from a security system at a facility, with the security system processing sensor signals from sensors and triggering the alarm condition;
sending by the server, system messages to determined nearby sensors to either turn on or start sending data back to the server system;
sending by the server system, queries to the sensors for sensor data according to the alarm condition;
receiving by the server system, video from cameras at the facility;
analyzing by the server system, sensor data received from the sensors, the analysis including a verification of the alarm condition, a determination of how often queried data is requested, a determination of which of selected data received from selected sensors to forward to one or more of a plurality of mixed reality devices, a determination of a specified function of one or more users associated with the plurality of mixed reality devices, and continually updated respective locations of the plurality of mixed reality devices; and
forwarding by the server system, data to the one or more of the plurality of mixed reality devices, with the forwarded data being determined in part based on the analysis performed by the server system with at least one of the one or more mixed reality devices including a processor device, memory in communication with the processor device and a head mounted display device including a stereoscopic 3D display.

9. The method of claim 8 further comprising:
receiving by the server system, a request for relevant information pertaining to the assertion of the alarm condition to be rendered on the head mounted display device.

10. The method of claim 8 wherein the server system, based on a nature of the condition, and network addresses of sensors determine the relevant nearby sensors; and
generate messages that are sent to the security system to adjust operation of the relevant nearby sensors.

11. The method of claim 8 further comprising:
constructing by the server system the queries to send to specific cameras to transmit video feeds from the specific cameras in the facility to the server system; and
sending by the server system the video feeds from the specific cameras to the one or more of the plurality of mixed reality devices.

12. The method of claim 8, further comprising:
executing by the server system an analytic processes to determine which sensors are sent the queries; and
constructing by the server system the queries to send to the determined sensors.

13. The method of claim 12, further comprising:
accessing by the server system a database for IP addresses of nearby sensors to construct the queries.

14. A server system comprising one or more processing devices and a memory configured to:
receive an assertion of an alarm condition from a security system that processes sensor signals from sensors and that triggers the alarm condition;
send messages to determined nearby sensors to start sending data back to the server system according to the alarm condition;
analyze sensor data received from the sensors, the analysis including a verification of the alarm condition, a determination of how often queried data is requested, a determination of which of selected data received from selected sensors to forward to one or more of a plurality of mixed reality devices, a determination of a specified function of one or more users associated with the plurality of mixed reality devices, and continually updated respective locations of the plurality of mixed reality devices; and
forward data to the one or more of the plurality of mixed reality devices, with the forwarded data being determined in part based on the analysis performed by the server system.

15. The server system of claim 14 is further configured to:
based on a nature of the condition, and network addresses of sensors determine the relevant nearby sensors; and
generate messages that are sent to the security system to adjust operation of the relevant nearby sensors, based on the analysis of the sensor data.

16. The server system of claim 14 is further configured to:
receive video feeds from cameras in the facility having the security system; and
send video feeds to the one or more of the plurality of mixed reality devices.

17. The server system of claim 14 is further configured to:
execute analytic processes to determine which sensors sent queries and construct the queries.

18. The server system of claim 14 is further configured to:
access a database for IP addresses of nearby sensors and form queries that are sent to those sensors through the network.

* * * * *